United States Patent
Huang et al.

(10) Patent No.: US 10,839,624 B2
(45) Date of Patent: Nov. 17, 2020

(54) SYSTEMS AND METHODS FOR ASSOCIATING AND PRESENTING AVIATION CHECKLIST DATA AND ELECTRONIC CIRCUIT BREAKER (ECB) DATA ONBOARD AN AIRCRAFT

(71) Applicant: HONEYWELL INTERNATIONAL INC., Morris Plains, NJ (US)

(72) Inventors: Haidong Huang, Beijing (CN); Guoqing Wang, Beijing (CN); Chuanbo Liang, Shanghai (CN); Jianfeng Guo, Beijing (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 165 days.

(21) Appl. No.: 15/907,487

(22) Filed: Feb. 28, 2018

(65) Prior Publication Data
US 2019/0266814 A1    Aug. 29, 2019

(51) Int. Cl.
| | |
|---|---|
| *G06F 3/048* | (2013.01) |
| *G07C 5/08* | (2006.01) |
| *B64F 5/40* | (2017.01) |
| *G06F 16/22* | (2019.01) |
| *G06F 16/28* | (2019.01) |
| *B64D 45/00* | (2006.01) |
| *G06F 3/0482* | (2013.01) |
| *G06Q 10/00* | (2012.01) |
| *G06Q 10/06* | (2012.01) |

(Continued)

(52) U.S. Cl.
CPC ............ *G07C 5/0825* (2013.01); *B64D 45/00* (2013.01); *B64F 5/40* (2017.01); *G06F 3/0482* (2013.01); *G06F 16/22* (2019.01); *G06F 16/288* (2019.01); *G06Q 10/00* (2013.01); *G06Q 10/063* (2013.01); *G06Q 10/06316* (2013.01); *G06F 3/0483* (2013.01); *G06K 9/00456* (2013.01)

(58) Field of Classification Search
CPC ...... B64D 2045/0075; B64F 5/40; B64F 5/60; G08G 5/0021; G08G 5/0047; G06F 16/22; G06F 16/288; G07C 5/0825
See application file for complete search history.

(56) References Cited

U.S. PATENT DOCUMENTS

| | | | |
|---|---|---|---|
| 6,753,891 B1 | 6/2004 | Chohan et al. | |
| 7,392,486 B1 | 6/2008 | Gyde et al. | |
| 7,580,235 B2 | 8/2009 | Hamasaki et al. | |

(Continued)

*Primary Examiner* — Claudia Dragoescu
(74) *Attorney, Agent, or Firm* — Lorenz & Kopf, LLP

(57) ABSTRACT

A method for providing Electronic Circuit Breaker (ECB) data onboard an aircraft is provided. The method obtains a current checklist applicable to current operations of the aircraft, by a processor communicatively coupled to an ECB system associated with the aircraft; obtains mapping data comprising mappings of aviation checklists mapped to associated ECB data, by the processor; identifies a subset of the ECB data associated with the current checklist, based on the mapping data, by the processor, wherein the current checklist includes a plurality of checklist tasks, and wherein the subset comprises at least one of the plurality of ECL tasks that includes an ECB instruction; filters the current checklist to create a filtered ECB list of the at least one of the plurality of checklist tasks, by the processor; and presents the filtered ECB list, via an ECB display onboard the aircraft.

14 Claims, 8 Drawing Sheets

(51) Int. Cl.
  *G06F 3/0483* (2013.01)
  *G06K 9/00* (2006.01)

(56) References Cited

U.S. PATENT DOCUMENTS

| | | |
|---|---|---|
| 8,698,653 B2 | 4/2014 | Rogers et al. |
| 9,002,571 B1 | 4/2015 | Gribble et al. |
| 9,171,273 B2 | 10/2015 | Thomas |
| 9,268,604 B1* | 2/2016 | Herzberg .................. G06F 9/50 |
| 9,637,244 B2 | 5/2017 | Wischmeyer et al. |
| 2009/0103221 A1* | 4/2009 | Aronson .................. H02J 3/14 |
| | | 361/93.2 |
| 2010/0152924 A1* | 6/2010 | Pandit .................... G01C 23/00 |
| | | 701/3 |
| 2012/0065790 A1* | 3/2012 | Boy ........................ H02J 1/14 |
| | | 700/291 |
| 2017/0088285 A1 | 3/2017 | Wischmeyer et al. |

\* cited by examiner

SYSTEMS AND METHODS FOR ASSOCIATING AND PRESENTING AVIATION CHECKLIST DATA AND ELECTRONIC CIRCUIT BREAKER (ECB) DATA ONBOARD AN AIRCRAFT

TECHNICAL FIELD

Embodiments of the subject matter described herein relate generally to the presentation of Electronic Circuit Breaker (ECB) data onboard an aircraft. More particularly, embodiments of the subject matter relate to associating ECB data to applicable Electronic Checklists (ECLs), and presenting relevant ECB data during completion of an associated ECL.

BACKGROUND

Hundreds of circuit breakers are used as electrical circuit protectors in commercial transport aircraft to support multiple, complex electrical systems. Aircraft manufacturers have increasingly begun installing remotely located solid state or electronic circuit breakers coupled to a data bus, in place of thermal circuit breakers that are heavy, that are less than optimally efficient, and which require a substantial amount of aircraft wiring.

A checklist for use onboard an aircraft generally includes one or more procedures, for example, checklist line items. Each checklist line item includes parameters applicable to a state check, switch status, setting, an associated Electronic Circuit Breaker (ECB) state, and the like. ECB items often are included as part of an ECL procedure. However, ECL and ECB systems onboard the aircraft are functionally independent of each other. During completion of an ECL, flight crew members are required to navigate screens, scroll, and otherwise manipulate the ECL display in order to view various ECB checklist items associated with the ECL.

Accordingly, it is desirable to provide related ECL and ECB data in an intuitive way, onboard the aircraft. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for providing Electronic Circuit Breaker (ECB) data onboard an aircraft. The method obtains a current checklist applicable to current operations of the aircraft, by a processor communicatively coupled to an ECB system associated with the aircraft; obtains mapping data comprising mappings of aviation checklists mapped to associated ECB data, by the processor; identifies a subset of the ECB data associated with the current checklist, based on the mapping data, by the processor, wherein the current checklist includes a plurality of checklist tasks, and wherein the subset comprises at least one of the plurality of ECL tasks that includes an ECB instruction; filters the current checklist to create a filtered ECB list of the at least one of the plurality of checklist tasks, by the processor; and presents the filtered ECB list, via an ECB display onboard the aircraft.

Some embodiments of the present disclosure provide a system for providing Electronic Circuit Breaker (ECB) data onboard an aircraft. The system includes: a system memory element; an ECB display device, configured to present the ECB data onboard the aircraft; and at least one processor, communicatively coupled to the system memory element, and the ECB display device. The at least one processor is configured to: obtain a current checklist applicable to current operations of the aircraft; obtain mapping data comprising mappings of aviation checklists mapped to associated ECB data; identify a subset of the ECB data associated with the current checklist, based on the mapping data, wherein the current checklist includes a plurality of checklist tasks, and wherein the subset comprises at least one of the plurality of checklist tasks that includes an ECB instruction; filter the current checklist to create a filtered ECB list of the at least one of the plurality of checklist tasks; and present the filtered ECB list, via the ECB display device onboard the aircraft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for providing Electronic Circuit Breaker (ECB) data onboard an aircraft. More specifically, the subject matter relates to providing applicable ECB data during completion of an Electronic Checklist (ECL) onboard the aircraft, wherein the ECB data is determined to be applicable when associated with a particular ECL task or checklist item. Also contemplated herein is the initialization of an ECL/ECB system for identifying and presenting ECB data related to a current ECL, by creating and storing mapped relationships between ECL tasks or "line items" and corresponding ECB data. In certain embodiments, the ECL/ECB data is determined and presented using an Electronic Flight Bag (EFB) application executed by a computing device.

Certain terminologies are used with regard to the various embodiments of the present disclosure. An Electronic Checklist (ECL) is a checklist for completion by a user associated with the aircraft (e.g., flight crew, maintenance personnel), wherein the checklist includes a plurality of ECL tasks to be completed. An ECL is a tool that supports flight crew airmanship and memory, by presenting actions required for performance and in the order of required performance. Such ECL tasks may be required before, during, or after a flight (e.g., pre-flight procedures, in-flight procedures, post-flight procedures). A current ECL is relevant to present, existing circumstances onboard the aircraft. Some ECL tasks are associated with one or more ECBs onboard the aircraft.

Figure 1:
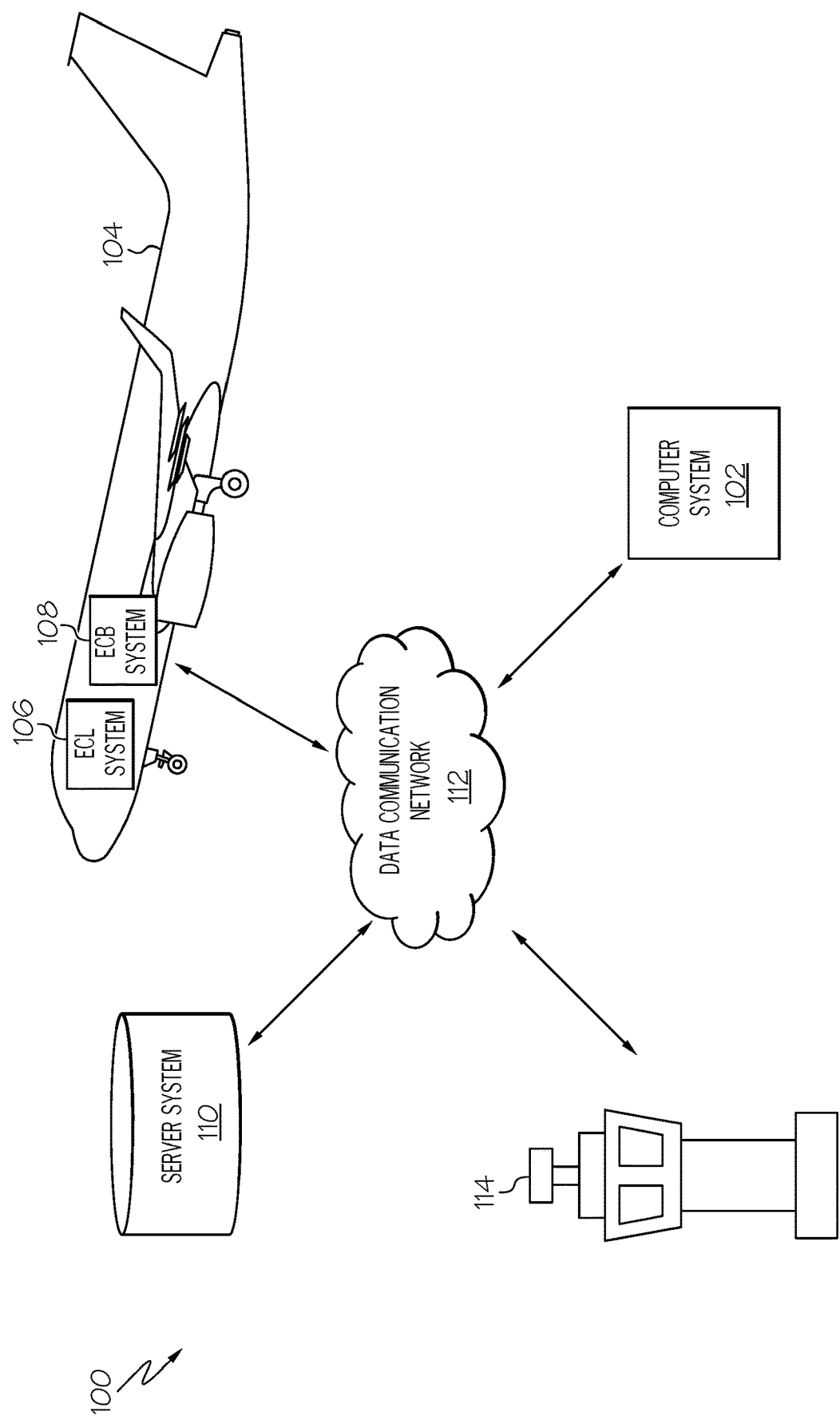
FIG. 1 is a diagram of an Electronic Checklist/Electronic Circuit Breaker (ECL/ECB) data system, in accordance with the disclosed embodiments.

Turning now to the figures, FIG. 1 is a diagram of an Electronic Checklist/Electronic Circuit Breaker (ECL/ECB) data system 100, in accordance with the disclosed embodiments. The ECL/ECB data system 100 operates to determine and present dynamic, real-time, ECB data associated with a current ECL onboard an aircraft 106, during completion of the current ECL by the flight crew. The ECL/ECB data system 100 may include, without limitation, a computer system 102 that communicates with an Electronic Checklist (ECL) system 106 and an Electronic Circuit Breaker (ECB) system 108, via a data communication network 112. In practice, certain embodiments of the ECL/ECB data system 100 may include additional or alternative elements and components, as desired for the particular application.

The computer system 102 may be implemented by any computing device that includes at least one processor, some form of memory hardware, a user interface, and communication hardware. For example, the computer system 102 may be implemented using a personal computing device, such as a tablet computer, a laptop computer, a personal digital assistant (PDA), a smartphone, or the like. In this scenario, the computer system 102 is capable of storing, maintaining, and executing an Electronic Flight Bag (EFB) application configured to determine and present ECB data applicable to the current ECL. In other embodiments, the computer system 102 may be implemented using a computer system onboard the aircraft 104, which is configured to determine and present ECB data applicable to the current ECL.

The aircraft 104 may be any aviation vehicle for which Electronic Checklists (ECLs) and Electronic Circuit Breaker (ECB) data are relevant and applicable to the aircraft type. The aircraft 104 may be implemented as an airplane, helicopter, spacecraft, hovercraft, or the like. The aircraft 104 includes a plurality of avionics systems, including the ECB system 108 and, in some embodiments, the ECL system 106.

In some embodiments, the ECL system 106 may be implemented as an aircraft onboard system (e.g., an avionics system). However, in other embodiments, the ECL system 106 may be implemented as an off-board system, which may be stored and maintained by an external server system 110 and/or a ground station 114, and accessed by avionics systems onboard the aircraft 104. The ECL system 106 stores, maintains, and presents ECLs applicable to the aircraft 104, and also receives and stores user input interactions to complete each of the ECLs. The ECL system 106 includes, without limitation: an ECL database, an ECL display device, and some form of ECL system 106 input/output (I/O). The ECL database functions to store a plurality of ECLs applicable to the aircraft 104. Each stored ECL includes a plurality of ECL tasks for completion by the flight crew. ECL tasks may include procedures involving an ECB. The ECL display device functions to present ECLs applicable to the aircraft 104. The ECL display device presents a current ECL in response to a user input selection. The ECL system I/O functions to receive user input selections of particular ECLs for presentation and completion by the user, and to receive user input indications of completion of particular ECL tasks.

The ECB system 108 is an avionics system that includes, manages, and operates the aircraft onboard ECBs, and presents ECB data onboard the aircraft 104. The ECB system 108 includes, without limitation: an ECB database, an ECB display device, and some form of ECB system 108 input/output (I/O). The ECB database functions to store and maintain ECB data, including parameters associated with individual ECBs onboard the aircraft. ECB parameters may include, without limitation, an applicable ECB bus type, ECB rating, ECB position, ECB status, or the like. The ECB display device typically functions to present ECB data. As described herein, the ECB display device also functions to present mapped ECL/ECB relationship data, a current ECL identifier, visual characteristics to indicate a completion status of ECL items associated with an ECB, or the like. The ECB system I/O functions to receive requests from the computer system 102 to display mapped ECL/ECB relationship data, including ECL tasks from a current ECL associated with one or more ECBs.

The ground station 114 may be an air traffic control station or any other ground-based location from which personnel communicate with the aircraft 104. The server system 110 may include any number of application servers, and each server may be implemented using any suitable computer. In some embodiments, the server system 110 includes one or more dedicated computers. In some embodiments, the server system 110 includes one or more computers carrying out other functionality in addition to server operations. The server system 110 may store and provide ECB data, ECL data, ECL/ECB mapping data (e.g., ECL/ECB relationship data) and any type of data used to determine new or additional mapping data based on a current ECL for the aircraft 104.

The computer system 102 is usually located onboard the aircraft 104 during operation of the ECL/ECB data system 100. However, in some embodiments, the computer system 102 may be implemented as an off-board computer. For example, the computer system 102 may be located at the ground station 114 and used by ground personnel monitoring and/or communicating with the aircraft 104. The computer system 102 communicates with the ECL system 106 (whether onboard ECL or off-board ECL) and the ECB system 108 via wired and/or wireless communication connection (e.g., via the data communication network 112 and/or via communication mechanisms onboard the aircraft 104).

The data communication network 112 may be any digital or other communications network capable of transmitting messages or data between devices, systems, or components. In certain embodiments, the data communication network 112 includes a packet switched network that facilitates packet-based data communication, addressing, and data routing. The packet switched network could be, for example, a wide area network, the Internet, or the like. In various embodiments, the data communication network 112 includes any number of public or private data connections, links or network connections supporting any number of communications protocols. The data communication network 112 may include the Internet, for example, or any other network based upon TCP/IP or other conventional protocols. In various embodiments, the data communication network 112 could also incorporate a wireless and/or wired telephone network, such as a cellular communications network for communicating with mobile phones, personal digital assistants, and/or the like. The data communication network 112 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

During typical operation, the computer system 102 identifies and obtains a current ECL, and uses the identifier for the current ECL to identify applicable ECB data associated with the current ECL. The applicable ECB data includes any ECL tasks (i.e., checklist items, line items) wherein the task is directly related to ECB maintenance, verification, and alerts. The computer system 102 "maps" or associates the identified ECB data to the applicable line item of the current ECL, to create mapping data. The computer system 102 may perform the mapping (i) as a pre-processing function, wherein the mapping data is pre-generated and stored for future use, or (ii) as a dynamic mapping function performed in real-time, during user viewing of, and/or user completion of, the current ECL. When pre-generated, the mapping data may be stored locally by the computer system 102, by a memory storage element onboard the aircraft 104, stored by the ECL system 106, stored by the ECB system 108, stored by a remote server (e.g., server system 110), and/or stored by a computer or other form of storage hardware at the ground station 114. When the mapping data is not stored locally by the computer system 102, the computer system 102 accesses the stored mapping data via the data communication network 112. However, in other embodiments, ECL/ECB mapping data is manually defined by an external source (e.g., an equipment manufacturer) and preloaded into the computer system 102, the ECL system 106, the ECB system 108, the server system 110, and/or a memory location or computer at the ground station 114.

As described previously, the applicable ECB data includes any ECL tasks or checklist items wherein the task is directly related to ECB maintenance, verification, and alerts. The computer system 102 then presents a filtered and grouped list of the applicable ECB data, via the ECB display (of the ECB system 108). The computer system 102 is further configured to continuously and dynamically identify and present applicable ECB data, during user completion of various ECLs onboard the aircraft 104. This dynamic, real-time filtering and grouping of ECB data applicable to a current ECL is presented via the ECB display during a concurrent presentation of ECL data via the ECL display. In this way, a user is presented with a concise summary of electronic checklist tasks/items associated with electronic circuit breakers (via the ECB display) without interruption to the continuous presentation of the current ECL (via the ECL display).

Figure 2:
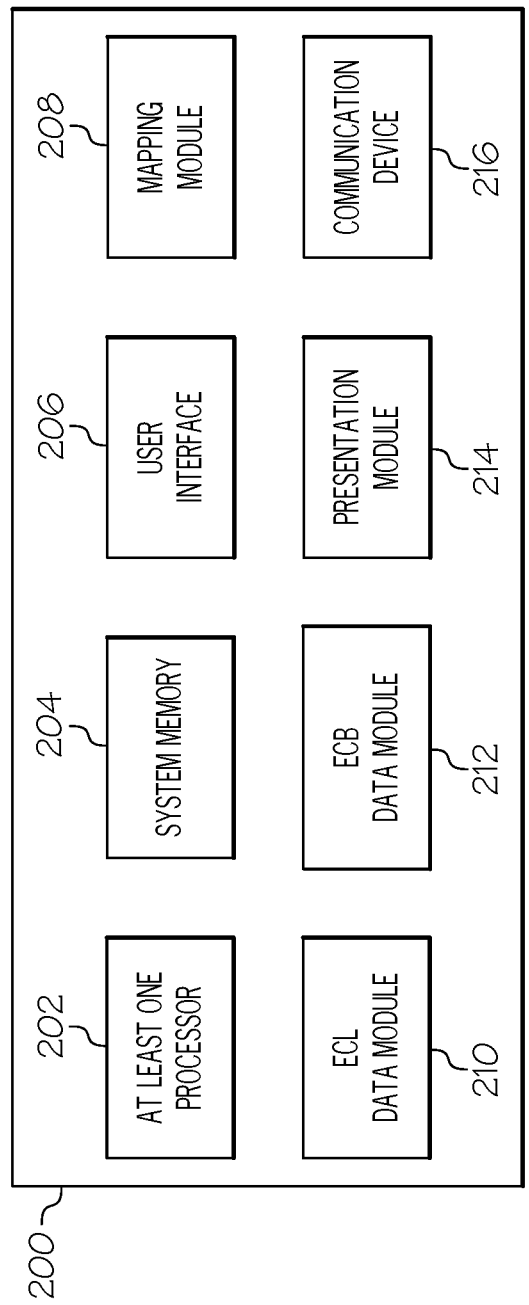
FIG. 2 is a functional block diagram of a computer system included in an ECL/ECB data system, in accordance with the disclosed embodiments.

FIG. 2 is a functional block diagram of a computer system 200 included in an ECL/ECB data system, in accordance with the disclosed embodiments. It should be noted that the computer system 200 can be implemented with the computer system 102 depicted in FIG. 1. In this regard, the computer system 200 shows certain elements and components of the computer system 102 in more detail.

The computer system 200 generally includes, without limitation: at least one processor 202; system memory 204; a user interface 206; a mapping module 208; an ECL data module 210; an ECB data module 212; a presentation module 214; and a communication device 216. These elements and features of the computer system 200 may be operatively associated with one another, coupled to one another, or otherwise configured to cooperate with one another as needed to support the desired functionality—in particular, providing ECB data applicable to a current ECL onboard an aircraft during completion of the current ECL by the flight crew, as described herein. For ease of illustration and clarity, the various physical, electrical, and logical couplings and interconnections for these elements and features are not depicted in FIG. 2. Moreover, it should be appreciated that embodiments of the computer system 200 will include other elements, modules, and features that cooperate to support the desired functionality. For simplicity, FIG. 2 only depicts certain elements that relate to the ECB/ECL data presentation techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated data associated with Electronic Checklist (ECL) data, Electronic Circuit Breaker (ECB) data, and ECL/ECB mapping or relationship data. The system memory 204 may be realized using any number of devices, components, or modules, as appropriate to the embodiment. Moreover, the computer system 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computer system 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the computer system 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computer system 200. For example, the user interface 206 could be manipulated by an operator to request a current ECL or to request the display of ECB data applicable to the current ECL, as described herein.

In certain embodiments, the user interface 206 may include or cooperate with various features to allow a user to interact with the computer system 200 via graphical elements rendered on a display element (not shown). Accordingly, the user interface 206 may initiate the creation, maintenance, and presentation of a graphical user interface (GUI). In certain embodiments, a display element implements touch-sensitive technology for purposes of interacting with the GUI. Thus, a user can manipulate the GUI by moving a cursor symbol rendered on the display element, or by physically interacting with the display element itself for recognition and interpretation, via the user interface 206.

The mapping module 208 is configured to generate ECL/ECB mapping data by obtaining ECL data from an ECL system (wherein the ECL system is located either onboard or off-board the aircraft), obtaining ECB data from an aircraft onboard ECB system, and mapping ECLs and/or ECL tasks to applicable ECB data (e.g., ECBs, ECB parameters). The mapped ECL data and ECB data illustrates relationships between the ECLs and/or ECL tasks to particular ECBs and ECB parameters associated with the ECBs. The ECB data applicable to a particular ECL includes any ECL tasks (i.e., checklist items, line items) wherein the task is directly related to ECB maintenance, verification, and alerts. Mapping data may be identified and stored (i) as a pre-processing function, wherein the mapping data is pre-generated and stored for future use, or (ii) as a dynamic mapping function performed in real-time, during user viewing of, and/or user completion of, the current ECL. When pre-generated, the mapping data may be stored locally by the system memory 204, stored by the ECL system, stored by the ECB system, stored by a remote server, and/or stored by a computer or other form of storage hardware at a ground station. When the mapping data is not stored locally by the computer system 200, the computer system 200 accesses the stored mapping data via the communication device 216.

The ECL data module 210 is configured to obtain ECL data for a current ECL associated with the aircraft. An Electronic Checklist (ECL) is a checklist for completion by a user associated with the aircraft (e.g., flight crew, maintenance personnel), wherein the checklist includes a plurality of ECL tasks to be completed. An ECL is a tool that supports flight crew airmanship and memory, by presenting actions required for performance and in the order of required performance. A current ECL is relevant to present, existing circumstances onboard the aircraft. Some ECL tasks are associated with one or more ECBs onboard the aircraft. Certain ECLs are relevant to pre-flight procedures, some ECLs are relevant to a particular phase of flight, and particular ECLs may be applicable to any pre-flight, in-flight, or post-flight phase or condition of the aircraft. The ECL data module 210 is further configured to obtain data associated with a current ECL, including (i) an identifier for the current ECL and/or an identifier for one or more ECB-related tasks of the current ECL, and (ii) completion status indicators for the ECB-related tasks for the current ECL.

The ECB data module 212 is configured to perform a lookup in the mapping data to identify ECB data that is applicable to a current ECL. The current ECL, and other ECL data, is obtained via the ECL data module 210. The current ECL is associated with an identifier (e.g., an identification number), and the ECB data module uses the identifier to locate ECB data associated with the current ECL in the mapping data. Each ECL includes a plurality of ECL tasks, and some of the ECL tasks include procedures associated with ECBs onboard the aircraft. The ECB data module 212 identifies the ECL tasks associated with ECBs and uses the mapping data to obtain specific ECB data applicable to the ECL tasks associated with ECBs. Such ECB data may include ECB parameters, which may include: an applicable ECB bus type, ECB rating, ECB position, ECB status, or the like.

The presentation module 214 is configured to present ECB data applicable to a current ECL, via an ECB display onboard the aircraft. The presentation module 214 filters and groups the ECB data obtained via the ECB data module 212, in order to display a filtered ECB list, as a concise summary of applicable ECB data that is displayed in a manner that is separate and distinct from the ECL display. The filtered ECB list includes a subset of ECL tasks that are associated with ECB procedures. The presentation module 214 is also configured to provide completion status data for each of the ECL tasks of the filtered ECB list. The presentation module 214 presents graphical elements, text, and/or text formatting (e.g., highlighting, underlining, bold text, italic text, font sizes) to indicate the completion status.

In practice, the mapping module 208, the ECL data module 210, the ECB data module 212, and/or the presentation module 214 may be implemented with (or cooperate with) the at least one processor 202 to perform at least some of the functions and operations described in more detail herein. In this regard, the mapping module 208, the ECL data module 210, the ECB data module 212, and/or the presentation module 214 may be realized as suitably written processing logic, application program code, or the like.

The communication device 216 is suitably configured to communicate data between the computer system 200 and one or more remote servers and one or more avionics systems onboard an aircraft. The communication device 216 may transmit and receive communications over a wireless local area network (WLAN), the Internet, a satellite uplink/downlink, a cellular network, a broadband network, a wide area network, or the like. As described in more detail below, data received by the communication device 216 may include, without limitation: ECL data, ECB data, mapped ECL/ECB relationship data, and other data compatible with the computer system 200. Data provided by the communication device 216 may include, without limitation, a request for a current ECL or other ECL data, a request for ECB data applicable to the current ECL or other ECB data, and the like.

Figure 3:
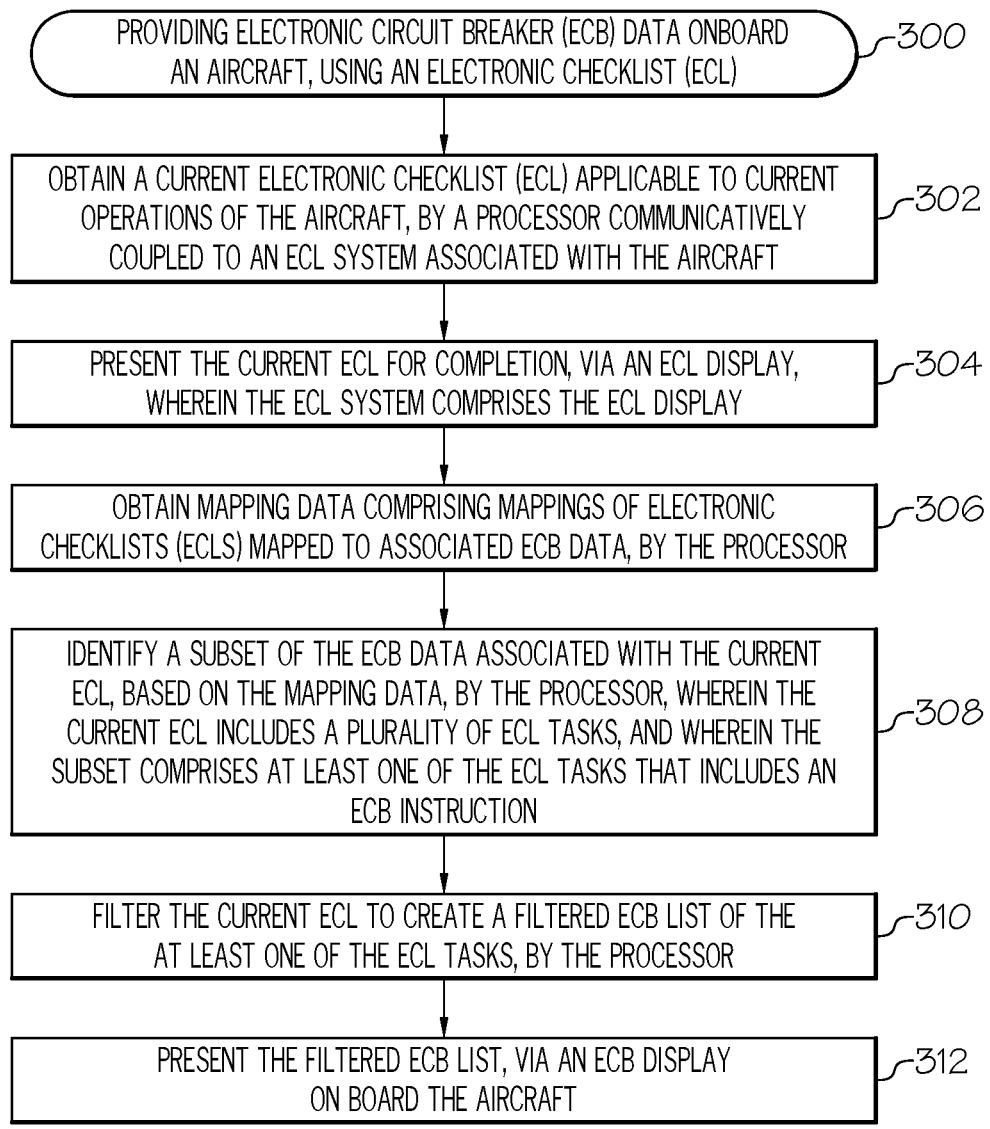
FIG. 3 is a flow chart that illustrates an embodiment of a process for providing Electronic Circuit Breaker (ECB) data onboard an aircraft, using an Electronic Checklist (ECL), in accordance with the disclosed embodiments.

FIG. 3 is a flow chart that illustrates an embodiment of a process 300 for providing Electronic Circuit Breaker (ECB) data onboard an aircraft, using an Electronic Checklist (ECL), in accordance with the disclosed embodiments. The process 300 obtains a current Electronic Checklist (ECL), by a processor communicatively coupled to an ECL system associated with the aircraft (step 302). The current ECL is relevant to present circumstances onboard the aircraft. The current ECL may be applicable to pre-flight procedures (e.g., pre-flight inspection tasks), in-flight procedures (e.g., flight phase specific procedures), or post-flight procedures. In certain embodiments, the process 300 obtains the current ECL in response to a user input selection received via a user interface communicatively coupled to the processor. Here, the process 300 receives user input requesting a particular ECL that is applicable to current operations of the aircraft. The particular ECL requested by the user includes an identifier to distinguish the particular, current ECL from other ECL data stored by the ECL system. In response to the user request, the process 300 receives the current ECL from the ECL system associated with the aircraft.

After obtaining the current ECL (step 302), the process 300 presents the current ECL for completion, via the ECL display onboard the aircraft, wherein the ECL system comprises the ECL display (step 304). The current ECL is presented by a typical ECL display onboard the aircraft.

The process 300 then obtains mapping data comprising mappings of ECLs mapped to associated ECB data (step 306). The mapping data includes ECL data (e.g., ECLs, ECL tasks, ECL identifiers) and corresponding ECB data that is mapped to applicable ECL data. Thus, the mapping data can be used to identify relationships between ECL data and ECB data. In some embodiments, the process 300 identifies mapping data and stores the mapping data for future use, thereby initializing the ECL/ECB data system. One exemplary embodiment of the initialization of the ECL/ECB data system is described with regard to FIG. 5, including additional detail. In other embodiments, the process 300 dynamically obtains mapping data, in real-time, such that the mapping data is directly applicable to a current ECL task or line item. One exemplary embodiment of dynamically obtaining mapping data is described with regard to FIG. 6, including additional detail.

After obtaining the mapping data (step 306), the process 300 identifies a subset of the ECB data associated with the current ECL, based on the current ECL, the identifier, and the mappings, by the processor, wherein the current ECL includes a plurality of ECL tasks, and wherein the subset comprises at least one of the ECL tasks that includes an ECB instruction (step 308). The subset of the ECB data corresponds to the current ECL, and the subset of ECB data is mapped to the current ECL in the mapping data.

The process 300 filters the current ECL to create a filtered ECB list of the at least one of the ECL tasks, by the processor (step 310). The subset of the ECB data includes ECL tasks associated with electronic circuit breakers onboard the aircraft, and associated ECB parameters. The filtered ECB list is a shorter list of ECB-specific tasks from the current ECL.

The process 300 then presents the filtered ECB list, via an ECB display onboard the aircraft (step 312). One suitable methodology for presenting the filtered ECB list is described below with reference to FIG. 4. The process 300 continues to present the current ECL, for user interaction, via the ECL display of the ECL system onboard the aircraft. Concurrently, the process 300 presents the filtered ECB list via a separate and distinct ECB display of the ECB system onboard the aircraft. In this way, the process 300 presents a concise summary of ECB tasks from the current ECL without disrupting completion of the ECL.

In certain embodiments, the process 300 presents the filtered ECB list in response to a user input selection received via a user interface communicatively coupled to the processor. The current ECL includes a plurality of ECL tasks relevant to present circumstances onboard the aircraft, and the ECL tasks include one or more tasks or procedures associated with ECBs onboard the aircraft. The filtered ECB list includes such ECB-specific tasks, procedures, or items from the current ECL. Here, the process 300 receives a user input request for a summary or filtered grouping of ECB-specific tasks from the current ECL.

Figure 4:
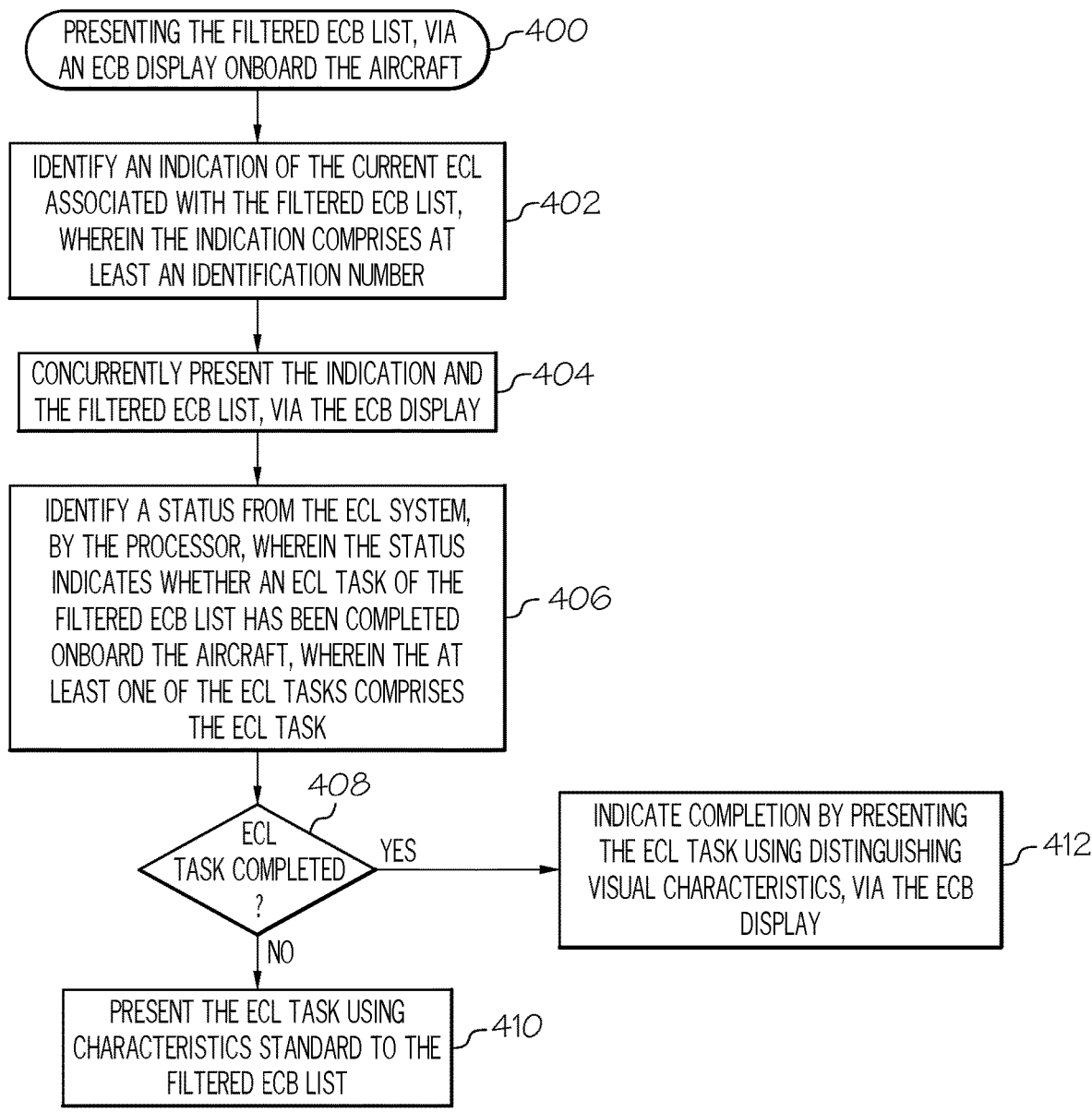
FIG. 4 is a flow chart that illustrates an embodiment of a process for presenting a filtered Electronic Circuit Breaker (ECB) display onboard the aircraft, in accordance with the disclosed embodiments.

FIG. 4 is a flow chart that illustrates an embodiment of a process 400 for presenting a filtered Electronic Circuit Breaker (ECB) display onboard the aircraft, in accordance with the disclosed embodiments. It should be appreciated that the process 400 described in FIG. 4 represents one embodiment of step 312 described above in the discussion of FIG. 3, including additional detail.

The process 400 identifies an indication of the current ECL associated with the filtered ECB list, wherein the indication comprises at least an identification number (step 402). The identification number distinguishes the current ECL from other stored ECLs of the ECL system. The process 400 concurrently presents the indication and the filtered ECB list, via the ECB display (step 404). The process 400 obtains the ECL data (e.g., the current ECL, the identification number) from the ECL system. The process 400 presents text and/or graphical elements representative of the filtered ECB list simultaneously with the identifier of the current ECL applicable to the filtered ECB list. In this way, the filtered ECB list is labeled or tagged with an identifier that serves as a visual indication to the user the particular ECL associated with the filtered ECB list.

The process 400 also identifies a status from the ECL system, by the processor, wherein the status indicates whether an ECL task of the filtered ECB list has been completed onboard the aircraft, and wherein the at least one of the ECL tasks comprises the ECL task (step 406). The process 400 determines whether the ECL task was completed (decision 408), based on the status. Generally, flight crew members provide user input to the ECL system to indicate completion of an ECL task, during completion of the ECL tasks associated with a particular checklist. In this scenario, the user input may include a selected checkbox, radio button, or other indication of checklist item completion. The ECL system stores the user input indicating completion of the ECL task as the status of the ECL task. In some embodiments, however, flight crew members may perform a visual inspection to complete an ECB checklist item on the ECB display of the ECB system, and provide a user input indication of completion of the ECB checklist item via the ECB system.

When the process 400 determines that the ECL task has not been completed (the "No" branch of 408), then the process 400 presents the ECL task using characteristics standard to the filtered ECB list (step 410). Here, the process 400 presents the incomplete ECL tasks using the same visual characteristics. The filtered ECB list is thus visually consistent, and indicates that the tasks have not been completed.

However, in some embodiments, when the process 400 determines that the ECL task has been completed (the "Yes"

branch of 408), then the process 400 indicates completion by presenting the ECL task using distinguishing visual characteristics, via the ECB display (step 412). The process 400 presents completed tasks such that completed tasks are visually different from incomplete tasks. Distinguishing visual characteristics may include highlighting, underlining, coloring and/or shading, and other visual effects. Here, the purpose of the status indication of a complete ECL task is to assist flight crew members to identify a location of the ECL (e.g., identify a particular row or checklist item) from which to resume or continue with visual inspection to a specific ECB item or checklist item when diverting his gaze back from other window (e.g., the ECL display).

Figure 5:
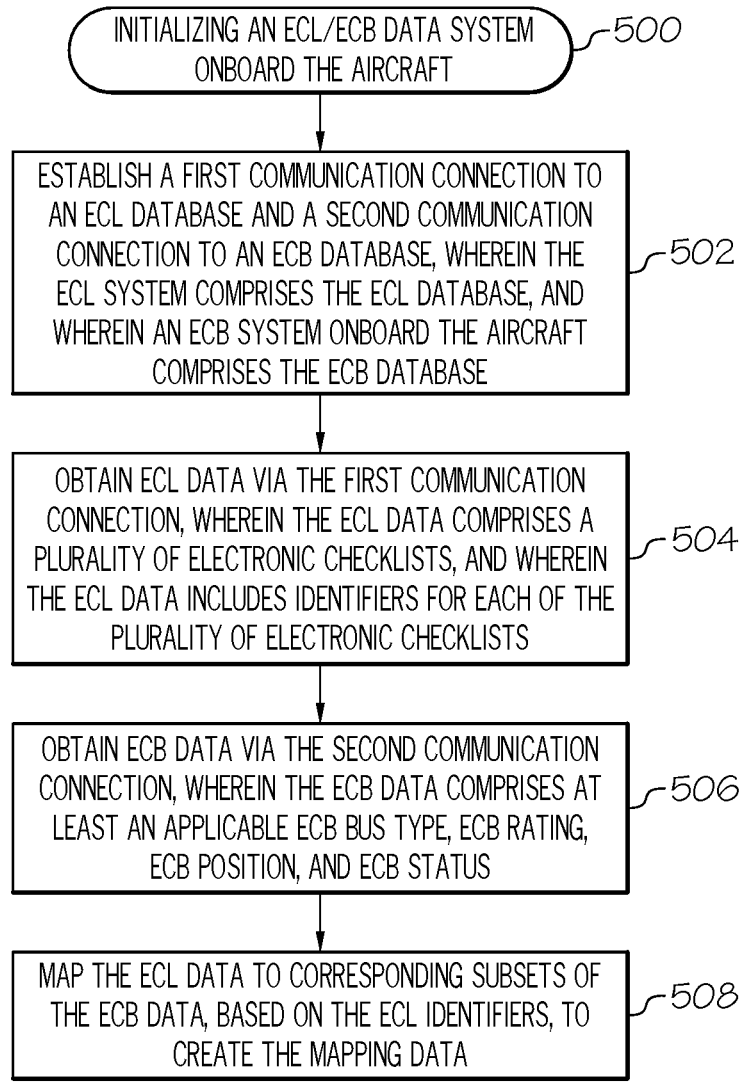
FIG. 5 is a flow chart that illustrates an embodiment of a process for initializing an ECL/ECB data system onboard the aircraft, in accordance with the disclosed embodiments.

FIG. 5 is a flow chart that illustrates an embodiment of a process 500 for initializing an Electronic Checklist/Electronic Circuit Breaker (ECL/ECB) data system onboard the aircraft, in accordance with the disclosed embodiments. It should be appreciated that the process 500 described in FIG. 5 represents one embodiment of step 306 described above in the discussion of FIG. 3, including additional detail.

The process 500 establishes a first communication connection to an ECL database and a second communication connection to an ECB database, wherein the ECL system comprises the ECL database, and wherein an ECB system onboard the aircraft comprises the ECB database (step 502). The process 500 establishes wired communication connections, wireless communication connections, or a combination of both wired and wireless communication connections. The ECL system and the ECB system are generally located onboard the aircraft. However, in some embodiments, the ECL system or the ECB system may include components that are external to the aircraft and/or remotely located (e.g., remote servers). In this scenario, the process 500 establishes communication connections to the components onboard the aircraft and the remotely located or external components.

The process 500 obtains ECL data via the first communication connection, wherein the ECL data comprises a plurality of electronic checklists, and wherein the ECL data includes identifiers for each of the plurality of electronic checklists (step 504). The ECL data is organized in the form of a hierarchy tree, including but not limited to: categories, sub-categories, checklists, and checklist line items. Due to the organizational hierarchy, there are several levels of data types. Each level of data types (e.g., "sub-category") has its own index to trace up to higher level data types. Typically, in an ECL database, an identifier for each checklist exists and is based on a specific category and sub-category. At the lowest level, each checklist line item has its own numerical identifier (e.g., 1, 2, 3). Using the "category" level as one example, a category is the highest level of classification of a list of checklists. Typically, each category is organized to reflect some logical sequence or grouping. Normal checklist procedures usually include the flow of events in preparing the aircraft for flight, flying the aircraft, and then shutting down the aircraft after a flight. Each category is capable of supporting sub-categories or checklists, and the titles of each sub-category or checklist may be displayed in a respective category menu (e.g., Normal, Abnormal, Emergency, User Defined, and others). Using the "sub-category" level as another example, a sub-category is the second level of classification of a list of checklists. Typically, each sub-category is organized to reflect some logical sequence or grouping. The Abnormal procedures (e.g., abnormal and emergency procedures) are usually grouped by the relevant, major aircraft subsystems (e.g., Fuel, Hydraulic, Electrical). The titles of each sub-category or checklist may be displayed in a respective sub-category menu (e.g., Interior Inspections, Exterior Inspections, Preflight Cockpit Check, Prestart Check). Using the "checklist" level as another example, a checklist is a collection of line items that define the procedure for the pilot to verify the aircraft status and manage aircraft systems for safe operation. Using the "item" level as another example, items (i.e., line items) are created to define a step or for the pilot to verify the aircraft status and manage aircraft systems for safe operation. Line items include the following attributes: text, sensor, timer, hyperlink, branch, inactive, primary, and secondary.

The process 500 obtains ECB data via the second communication connection, wherein the ECB data comprises parameters associated with each of the aircraft onboard ECBs (step 506). Parameters associated with each Electronic Circuit Breaker onboard the aircraft may include, without limitation, an applicable ECB bus type, ECB rating, ECB position, ECB status, or the like. Here, the process 500 obtains the ECB parameter data directly from the aircraft onboard ECB system, wherein the ECB system is an avionics system that includes, manages, and operates the aircraft onboard ECBs. The ECB system includes an ECB database (to store and maintain ECB data), an ECB display device (to present ECB data and ECL/ECB data), and some form of ECB system input/output (I/O).

The process 500 maps the ECL data to corresponding subsets of the ECB data, based on the ECL identifiers, to create the mapping data (step 508). Each Electronic Checklist (ECL) includes a plurality of ECL tasks for completion by flight crew members. Some ECL tasks are associated with an ECB. For example, one of the plurality of ECL tasks (e.g., ECL task "A") may be to perform a check for a particular ECB (e.g., ECB #1). The ECL task is mapped to parameters for a particular ECB. In this example, the subset of ECB data includes parameters for ECB #1, and ECL task "A" is mapped to the parameters for ECB #1. In certain embodiments, the process 500 maps an ECL identifier to a corresponding ECB identifier, to create the mapping data. The ECB identifiers may then be used to obtain corresponding subsets of the ECB data for presentation.

Mappings of ECL tasks to applicable ECB parameters are used to create a stored repository of mapping data, as described previously with regard to FIG. 1. The ECL/ECB data system is initialized by creating the ECL/ECB mapping data that stores relationships between Electronic Checklists (ECLs) and ECL tasks, and Electronic Circuit Breakers (ECBs) onboard the aircraft. Thus, the ECL/ECB system is used to provide ECL/ECB relationship data for viewing by the flight crew during use of the ECL system.

Figure 6:
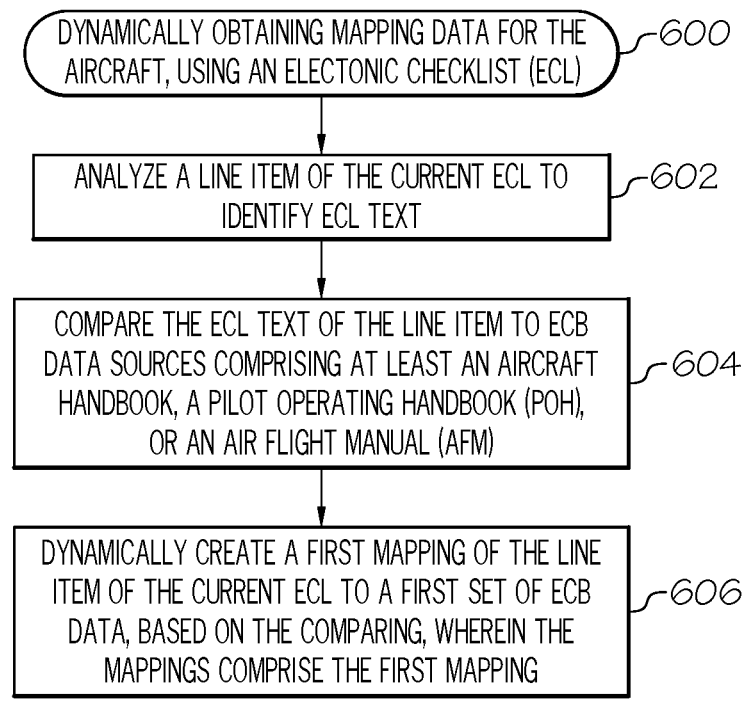
FIG. 6 is a flow chart that illustrates an embodiment of a process for dynamically obtaining mapping data for the aircraft, using an Electronic Checklist (ECL), in accordance with the disclosed embodiments.

FIG. 6 is a flow chart that illustrates an embodiment of a process 600 for dynamically obtaining mapping data for the aircraft, using an Electronic Checklist (ECL), in accordance with the disclosed embodiments. It should be appreciated that the process 600 described in FIG. 6 represents one embodiment of step 306 described above in the discussion of FIG. 3, including additional detail. First, the process 600 analyzes a line item of the current Electronic Checklist (ECL) to identify ECL text (step 602). Each ECL includes a plurality of ECL tasks, line items, or checklist items. Each of the ECL items is a task or procedure associated with the aircraft, wherein the task is presented for user completion. Here, the process 600 identifies the text of the ECL task, wherein the text includes words and phrases of the instruction for completion.

The process 600 then compares the ECL text of the line item to Electronic Circuit Breaker (ECB) data sources comprising at least an aircraft handbook, a Pilot Operating Handbook (POH), or an Air Flight Manual (AFM) (step 604). Here, the process 600 identifies text that is common to both sources. In other words, the process 600 compares the ECL text of the current ECL line item to the text of one or more of the ECB data sources to locate matching text. The ECB data sources may include matching text, and the matching text corresponds to particular ECB data associated with the aircraft (e.g., wherein the ECB data comprises ECB parameters including at least ECB bus type, ECB rating, ECB position, and ECB status).

The process 600 then dynamically creates a first mapping of the line item of the current ECL to a first set of ECB data, based on the comparing, wherein the mappings comprise the first mapping (step 606). The process 600 associates the line item to the ECB data that includes text that matches the text of the ECL line item.

Figure 7:
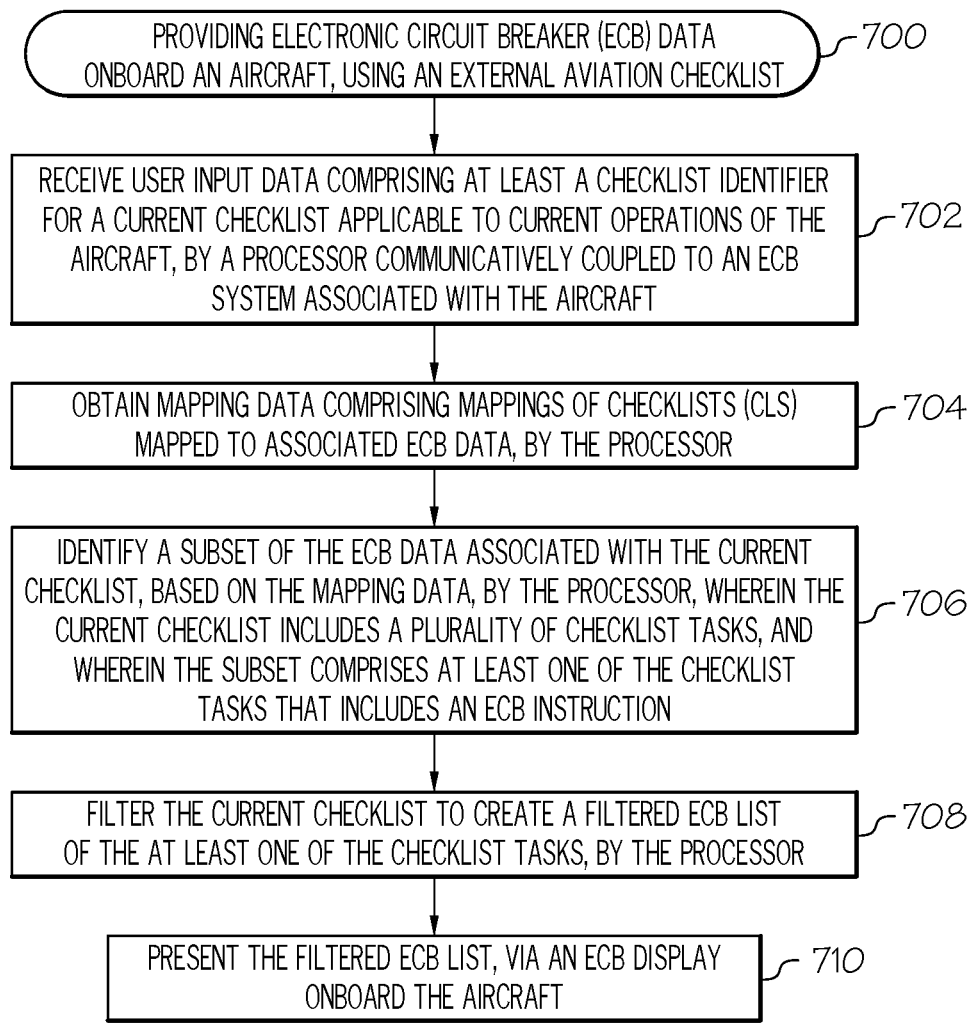
FIG. 7 is a flow chart that illustrates an embodiment of a process for providing Electronic Circuit Breaker (ECB) data onboard an aircraft, using an external aviation checklist, in accordance with the disclosed embodiments.

FIG. 7 is a flow chart that illustrates an embodiment of a process 700 for providing Electronic Circuit Breaker (ECB) data onboard an aircraft, using an external aviation checklist, in accordance with the disclosed embodiments. First, the process 700 receives user input data comprising at least a checklist identifier for a current checklist applicable to current operations of the aircraft, by a processor communicatively coupled to an Electronic Circuit Breaker (ECB) system associated with the aircraft (step 702). The current checklist is an "external" aviation checklist, or in other words, a checklist that is not presented for completion via an integrated electronic checklist (ECL) system onboard the aircraft. The external aviation checklist may be implemented using a paper checklist (e.g., a physical printed copy of the checklist), an electronic version of the checklist stored and maintained locally by a personal computing device, or any other type of checklist that is external to the aircraft onboard systems. The current checklist is relevant to present circumstances onboard the aircraft. The current checklist may be applicable to pre-flight procedures (e.g., pre-flight inspection tasks), in-flight procedures (e.g., flight phase specific procedures), or post-flight procedures. The current checklist is associated with an identifier that distinguishes the particular, current checklist from other aviation checklists stored by the aircraft onboard system. In response to the user request, the process 700 identifies the current checklist, including tasks or line-items of the current checklist.

After receiving the user input identifier for the current checklist (step 702), the process 700 obtains mapping data comprising mappings of checklists mapped to associated ECB data (step 704). The mapping data includes checklist data (e.g., checklists, checklist tasks, checklist identifiers) and corresponding ECB data that is mapped to applicable checklist data. Thus, the mapping data can be used to identify relationships between checklist data and ECB data. In some embodiments, the process 700 identifies mapping data and stores the mapping data for future use, thereby initializing the applicable system. One exemplary embodiment of system initialization is described with regard to FIG. 5, including additional detail. In other embodiments, the process 700 dynamically obtains mapping data, in real-time, such that the mapping data is directly applicable to a current checklist task or line item. One exemplary embodiment of dynamically obtaining mapping data is described with regard to FIG. 8, including additional detail.

After obtaining the mapping data (step 704), the process 700 identifies a subset of the ECB data associated with the current checklist, based on the current checklist, the identifier, and the mappings, by the processor, wherein the current checklist includes a plurality of checklist tasks, and wherein the subset comprises at least one of the checklist tasks that includes an ECB instruction (step 308). The subset of the ECB data corresponds to the current checklist, and the subset of ECB data is mapped to the current checklist in the mapping data.

The process 700 filters the current checklist to create a filtered ECB list of the at least one of the checklist tasks, by the processor (step 708). The subset of the ECB data includes checklist tasks associated with electronic circuit breakers onboard the aircraft, and associated ECB parameters. The filtered ECB list is a shorter list of ECB-specific tasks from the current checklist.

The process 700 then presents the filtered ECB list, via an ECB display onboard the aircraft (step 710). One suitable methodology for presenting the filtered ECB list is described with reference to FIG. 4. Here, the process 700 presents the filtered ECB list via an ECB display of the ECB system onboard the aircraft. In this way, the process 700 presents a concise summary of ECB tasks from the current checklist.

In certain embodiments, the process 700 presents the filtered ECB list in response to a user input selection received via a user interface communicatively coupled to the processor. The current checklist includes a plurality of checklist tasks relevant to present circumstances onboard the aircraft, and the checklist tasks include one or more tasks or procedures associated with ECBs onboard the aircraft. The filtered ECB list includes such ECB-specific tasks, procedures, or items from the current checklist. Here, the process 700 receives a user input request for a summary or filtered grouping of ECB-specific tasks from the current checklist.

Figure 8:
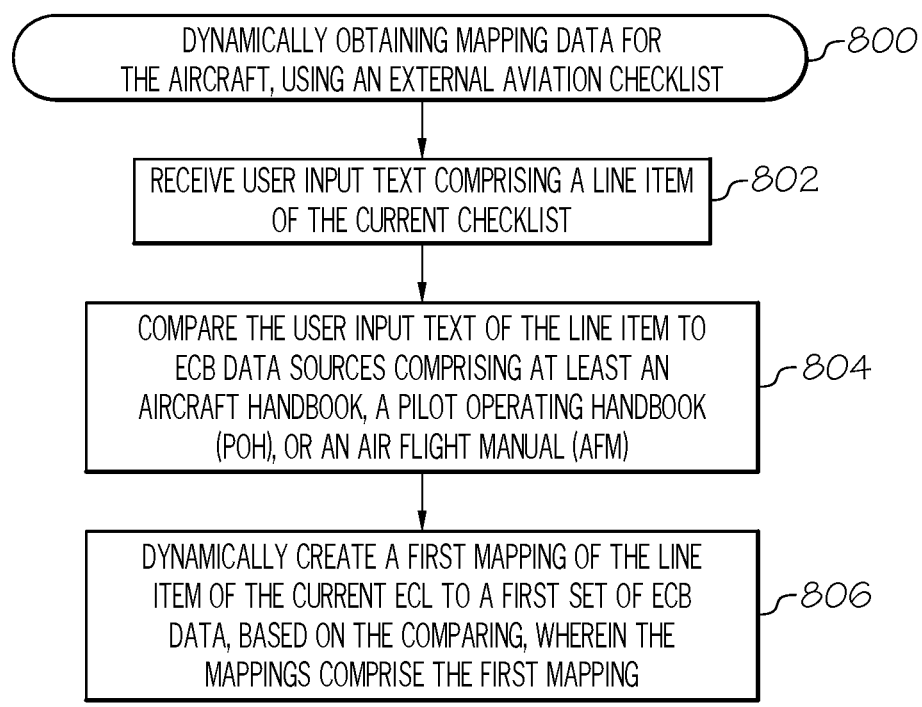
FIG. 8 is a flow chart that illustrates an embodiment of a process for dynamically obtaining mapping data for the aircraft, using an external aviation checklist, in accordance with the disclosed embodiments.

FIG. 8 is a flow chart that illustrates an embodiment of a process 800 for dynamically obtaining mapping data for the aircraft, using an external aviation checklist, in accordance with the disclosed embodiments. It should be appreciated that the process 800 described in FIG. 8 represents one embodiment of step 704 described above in the discussion of FIG. 7, including additional detail. First, the process 800 receives user input text comprising a line item of the current checklist (step 802). The external aviation checklist may be implemented using a paper checklist (e.g., a physical printed copy of the checklist), an electronic version of the checklist stored and maintained locally by a personal computing device, or any other type of checklist that is external to the aircraft onboard systems. Each checklist includes a plurality of checklist tasks, line items, or checklist items. Each of the checklist items is a task or procedure associated with the aircraft, wherein the task is presented for user completion. Here, the process 800 identifies the text of the checklist task, wherein the text includes words and phrases of the instruction for completion.

The process 800 then compares the user input text of the line item to Electronic Circuit Breaker (ECB) data sources comprising at least an aircraft handbook, a Pilot Operating Handbook (POH), or an Air Flight Manual (AFM) (step 804). Here, the process 800 identifies text that is common to both sources. In other words, the process 800 compares the user input text of the current checklist line item to the text of one or more of the ECB data sources to locate matching text. The ECB data sources may include matching text, and the matching text corresponds to particular ECB data associated with the aircraft (e.g., wherein the ECB data comprises ECB parameters including at least ECB bus type, ECB rating, ECB position, and ECB status).

The process 800 then dynamically creates a first mapping of the line item of the current checklist to a first set of ECB data, based on the comparing, wherein the mappings comprise the first mapping (step 806). The process 800 associates the line item to the ECB data that includes text that matches the text of the checklist line item (i.e., the user input text).

The various tasks performed in connection with processes 300-800 may be performed by software, hardware, firmware, or any combination thereof. For illustrative purposes, the preceding description of processes 300-800 may refer to elements mentioned above in connection with FIGS. 1-2. In practice, portions of processes 300-800 may be performed by different elements of the described system. It should be appreciated that processes 300-800 may include any number of additional or alternative tasks, the tasks shown in FIGS. 3-8 need not be performed in the illustrated order, and processes 300-800 may be incorporated into a more comprehensive procedure or process having additional functionality not described in detail herein. Moreover, one or more of the tasks shown in FIGS. 3-8 could be omitted from embodiments of the processes 300-800 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The preceding description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for providing Electronic Circuit Breaker (ECB) data onboard an aircraft, the method comprising:
    obtaining a current electronic checklist (ECL) applicable to current flight operations by an aircrew of the aircraft, by a processor that is part of an ECL/ECB avionics data system that is located on board a computer system of the aircraft;
    obtaining mapping data comprising mappings of ECLs mapped to associated ECB data, by the processor;
    identifying a subset of the ECB data associated with the current ECL, based on the mapping data, by the processor, wherein the current ECL includes a plurality of ECL tasks, and wherein the subset comprises at least one of the plurality of ECL tasks that includes an ECB instruction;
    filtering the current ECL to create a filtered ECB list of the at least one of the plurality of ECL tasks, by the processor; and
    presenting the filtered ECB list, via an ECB display onboard the aircraft.

2. The method of claim 1, further comprising:
    identifying an indication of the current ECL associated with the filtered ECB list, by the processor, wherein the indication comprises at least an identification number; and
    concurrently presenting the indication and the filtered ECB list, via the ECB display.

3. The method of claim 1, further comprising:
    obtaining a current Electronic Checklist (ECL) applicable to current operations of the aircraft, by the processor communicatively coupled to an ECL system associated with the aircraft, wherein the current checklist comprises the current ECL; and
    presenting the current ECL for completion, via an ECL display, wherein the ECL system comprises the ECL display;
    wherein the mapping data comprising mappings of Electronic Checklists (ECLs) mapped to associated ECB data.

4. The method of claim 3, wherein obtaining the mapping data further comprises:
    analyzing a line item of the current ECL to identify ECL text;
    comparing the ECL text of the line item to ECB data sources comprising at least an aircraft handbook, a Pilot Operating Handbook (POH), or an Air Flight Manual (AFM); and
    dynamically creating a first mapping of the line item of the current ECL to a first set of ECB data, based on the comparing, wherein the mappings comprise the first mapping.

5. The method of claim 3, further comprising:
    before obtaining the current ECL from the ECL system, receiving a user input selection to complete the current ECL, via a user interface communicatively coupled to the ECL display and the ECL system onboard the aircraft, wherein the current ECL is associated with an identifier;
    wherein identifying the subset of the ECB data associated with the current ECL further comprises:
        identifying the current ECL in a stored mapping database, using the identifier, wherein the mapping data comprises the stored mapping database; and
        identifying the subset of the ECB data associated with the current ECL, based on the identifier and the mappings.

6. The method of claim 3, further comprising:
    initializing an ECL/ECB data system onboard the aircraft, by identifying relationships between ECL data associated with the aircraft and the ECB data and storing the relationships onboard the aircraft.

7. The method of claim 6, wherein initializing the ECL/ECB data system further comprises:
    establishing a first communication connection to an ECL database and a second communication connection to an ECB database, wherein the ECL system comprises the ECL database, and wherein an ECB system onboard the aircraft comprises the ECB database;
    obtaining ECL data via the first communication connection, wherein the ECL data comprises a plurality of electronic checklists, and wherein the ECL data includes ECL identifiers for each of the plurality of electronic checklists;
    obtaining ECB data via the second communication connection, wherein the ECB data comprises ECB parameters including at least ECB bus type, ECB rating, ECB position, and ECB status; and
    mapping the ECL data to corresponding subsets of the ECB data, based on the ECL identifiers, to create the mapping data, wherein the relationships comprise at least the ECL identifiers and the corresponding subsets of the ECB data.

8. A system for providing Electronic Circuit Breaker (ECB) data onboard an aircraft, the system comprising:
    a system memory element;
    an ECB display device, configured to present the ECB data onboard the aircraft;
    at least one processor, communicatively coupled to the system memory element, and the ECB display device, where the at least one processor is part of an ECL/ECB avionics data system that is located on board a computer system of the aircraft and is configured to:
        obtain a current electronic checklist (ECL) applicable to current flight operations by an aircrew of the aircraft;
        obtain mapping data comprising mappings of ECLs mapped to associated ECB data;
        identify a subset of the ECB data associated with the current ECL, based on the mapping data, wherein the current ECL includes a plurality of ECL tasks, and wherein the subset comprises at least one of the plurality of ECL tasks that includes an ECB instruction;
        filter the current ECL to create a filtered ECB list of the at least one of the plurality of ECL tasks; and
        present the filtered ECB list, via the ECB display device onboard the aircraft.

9. The system of claim 8, wherein the at least one processor is further configured to:
    identify an indication of the current ECL associated with the filtered ECB list, wherein the indication comprises at least an identification number; and
    concurrently present the indication and the filtered ECB list, via the ECB display device.

10. The system of claim 8, further comprising an Electronic Checklist (ECL) display device communicatively coupled to the at least one processor, the ECL display device configured to present electronic checklist items onboard the aircraft;
    wherein the at least one processor is further configured to:
        obtain a current Electronic Checklist (ECL) applicable to current operations of the aircraft; and present the current ECL for completion, via the ECL display onboard the aircraft, wherein the ECL system comprises the ECL display device; and wherein the mapping data comprising mappings of Electronic Checklists (ECLs) mapped to associated ECB data.

11. The system of claim 10, wherein the at least one processor is further configured to obtain the mapping data, by:

analyzing a line item of the current ECL to identify ECL text;

comparing the ECL text of the line item to ECB data sources comprising at least an aircraft handbook, a Pilot Operating Handbook (POH), or an Air Flight Manual (AFM); and dynamically creating a first mapping of the line item of the current ECL to a first set of ECB data, based on the comparing, wherein the mappings comprise the first mapping.

12. The system of claim 10, wherein the system further comprises a user interface communicatively coupled to the at least one processor;

wherein, before obtaining the current ECL from the ECL system, the at least one processor is further configured to receive a user input selection to complete the current ECL, via the user interface, wherein the current ECL is associated with an identifier; and wherein the at least one processor is further configured to identify the subset of the ECB data associated with the current ECL, by:

identifying the current ECL in a stored mapping database, using the identifier, wherein the mapping data comprises the stored mapping database; and identifying the subset of the ECB data associated with the current ECL, based on the identifier and the mappings.

13. The system of claim 10, wherein the at least one processor is further configured to:

initialize an ECL/ECB data system onboard the aircraft, by identifying relationships between ECL data associated with the aircraft and the ECB data and storing the relationships onboard the aircraft.

14. The system of claim 13, wherein the at least one processor is configured to initialize the ECL/ECB data system, by:

establishing a first communication connection to an ECL database and a second communication connection to an ECB database, wherein the ECL system comprises the ECL database, and wherein an ECB system onboard the aircraft comprises the ECB database;

obtaining ECL data via the first communication connection, wherein the ECL data comprises a plurality of electronic checklists, and wherein the ECL data includes ECL identifiers for each of the plurality of electronic checklists;

obtaining ECB data via the second communication connection, wherein the ECB data comprises ECB parameters including at least ECB bus type, ECB rating, ECB position, and ECB status; and mapping the ECL data to corresponding subsets of the ECB data, based on the ECL identifiers, to create the mapping data, wherein the relationships comprise at least the ECL identifiers and the corresponding subsets of the ECB data.

* * * * *